United States Patent [19]

Leture et al.

[11] Patent Number: 5,709,743
[45] Date of Patent: Jan. 20, 1998

[54] SETTING AND HARDENING ACCELERATING AGENT FOR SILICEOUS HYDRAULIC BINDERS

[75] Inventors: Philippe Leture, Villeurbanne; Jacques Chappuis, Frontonas; Bruno Latrasse, Villefontaine, all of France

[73] Assignee: LaFarge, Paris, France

[21] Appl. No.: 586,697

[22] PCT Filed: Jun. 20, 1994

[86] PCT No.: PCT/FR94/00744

§ 371 Date: Jun. 28, 1996

§ 102(e) Date: Jun. 28, 1996

[87] PCT Pub. No.: WO95/04007

PCT Pub. Date: Feb. 9, 1995

[30] Foreign Application Priority Data

Jul. 29, 1993 [FR] France ................................. 93 09582

[51] Int. Cl.$^6$ ................................................. C04B 22/00
[52] U.S. Cl. ......................... 106/713; 106/735; 106/737; 106/785; 106/819
[58] Field of Search ............................ 106/819, 638, 106/757, 785, 735, 713, 737

[56] References Cited

U.S. PATENT DOCUMENTS

Re. 35,194    4/1996   Gerber ........................ 106/819
4,402,922    9/1983   Gaynor et al. ................ 106/775
4,504,315    3/1985   Allemann et al. ............. 106/819
4,650,523    3/1987   Kikuchi et al. ............... 106/819

FOREIGN PATENT DOCUMENTS 0 497 691    8/1992   European Pat. Off. .
497691       8/1992   European Pat. Off. .
1 213 645   11/1959   France .
1 276 696   10/1961   France .
771042      10/1980   U.S.S.R. .

OTHER PUBLICATIONS

Database WPI, Week 8125, AN 81-45758D & SU,A,771 042, Oct. 16, 1980.

Primary Examiner—Paul Marcantoni
Attorney, Agent, or Firm—Millen, White, Zelano & Branigan, P.C.

[57] ABSTRACT

Setting and hardening accelerating agent for siliceous hydraulic binders wherein: a) it is obtained by hydration, in the usual pressure and temperature conditions, and grinding of a siliceous hydraulic binder aqueous suspension; b) the suspension particles are sufficiently fine for the agent to meet the following test requirements: an aqueous suspension in a sedimentation specimen at 20° C., containing 10 grams (dry weight) of the accelerating agent in 100 ml of water, must have a sedimentation deposit height at least equal to 50% of the initial height at the end of two days; c) it is in the form of an aqueous suspension.

18 Claims, No Drawings

SETTING AND HARDENING ACCELERATING AGENT FOR SILICEOUS HYDRAULIC BINDERS

The present invention relates to a new agent for accelerating the setting and hardening of siliceous hydraulic binders, under usual temperature and pressure conditions.

Usual temperature and pressure conditions are understood to mean, in the present description, a temperature not exceeding 90° C. and most often less than 80° C. and a pressure of the order of magnitude of atmospheric pressure.

Shortening the consolidation time of mixtures based on siliceous hydraulic binders is an important condition for certain work, in particular for cold-weather concrete placing, fast demolding or form removal, manufacture of prefabricated units, sealings, waterproofing, sprayed concretes, coatings of facades, and the like.

It is known that the consolidation of mixtures based on hydraulic binders is divided into two stages which more or less overlap: the first is denoted by the name of "setting" and the second by "hardening", the combined process being known as consolidation. Setting is determined using a Vicat setting tester and hardening is determined by the initial mechanical strengths.

Setting of cements results from the incorporation of water in a siliceous hydraulic binder which triggers, by hydration of the anhydrous inorganic oxides, irreversible crystal formation reactions, the intermeshing of the crystals thickening and "solidifying" the paste. This strengthening, which can be very sudden, marks the beginning of setting. Setting is exothermic and it is accelerated by an external heat contribution (for example, steam curing of precast concretes). The time of the beginning of setting is the period of time which has passed between forming the paste by mixing with water and a significant strengthening, corresponding to the moment when the Vicat needle, plunging into the paste, no longer reaches the bottom, in accordance with EN standard 196-3 for pure pastes and with NF standard P15-431 for mortars. The time of the beginning of setting of pure cement pastes is a component of their standardized characteristics. Thus, the time of the beginning of setting of Portland cements, for grades 35 and 45, at 20° C., is greater than 1 h 30 and greater than 1 h for grades 55 and HP (high performance) of Portland cements, under the same conditions. The time of the end of setting corresponds to the moment when the Vicat needle no longer penetrates the pure paste or the mortar.

Hardening follows the phenomenon of setting: the strength, still mediocre at the end of the setting, will increase throughout the hardening, rapidly at the beginning and then increasingly slowly. Cements are regarded as having finished ⅘th of their hardening after 28 days but hardening can still continue for several months.

By virtue of the hardening following on the setting, the binders and the structural components manufactured with them acquire the properties which correspond to the use envisaged and which are a function of the choice of the binder and of the aggregates, as well as of the manufacturing process.

Shortening the consolidation can be obtained by various means, such as a heat treatment, chemical additions or a greater fineness of the hydraulic binder.

Many chemical compounds are known which are capable of accelerating the setting and the hardening of siliceous hydraulic binders.

The most effective and the best known accelerator is calcium chloride. However, the use of this accelerator, in the preparation of grouts, mortars and concretes, is regulated by the D.T.U.* No. 21.4 of October 1977 amended in April 1979, in order to limit:

the risk of corrosion of steels by the chloride ion, the risk of an increase, even low, in the porosity due to an excess of chloride or to the use capable of having an effect on the durability of grouts, mortars or concretes.

*D.T.U. means unified technical document (indicating the rules of the building art and techniques)

Consequently, the use of $CaCl_2$ is very restricted in all concretes reinforced with metal reinforcements. However, $CaCl_2$ remains the most widely used accelerating agent in non-reinforced concretes, whenever economical manufacture is sought for, as is the case in precasting.

Chlorine-free admixtures are, in contrast, intended for certain reinforced items (most often the case of mold-hardened concrete) and for shuttered concrete.

It is possible to use, as non-chlorinated admixtures, alkaline bases (sodium hydroxide, potassium hydroxide, ammonia, sodium or potassium carbonates and sodium or potassium silicates) or alkali metal or alkaline-earth metal nitrates and carboxylates. They are used at doses, on a dry basis, of between 0.5 and 2% of the weight of the cement. They are on the whole recommended for the following work: cold-weather concrete placing, fast or form removal, sealing, water-proofing, sometimes sprayed concrete and underwater work.

It has also been proposed to accelerate hardening of grouts, mortars and concretes by incorporating therein, during mixing, appropriate crystalline seeds.

In a first article (Annales de l'Institut Technique du Bâtiment et des Travaux Publics, February 1956, No. 98, pages 137 to 138, by Messrs Duriez and Lézy), in a theoretical approach, it is suggested that crystalline seeds would make it possible to accelerate hardening and also to increase the mean mechanical strengths at 7 days of cement pastes and of mortars containing hydraulic binders such as artificial Portland cements. In the experimental part, the seeds used were obtained by hydration of a pure cement paste containing 250 $cm^3$ of water per 1 kg of cement. These pastes were stored for 24 hours at 20° C. at as high a hygrometry as possible and they were then immersed for 7 days in water at the same temperature of 20°, 50° and 100° C.; they were then crushed into nodules which were stored in a ventilated oven for 5 days at 50° C. The dried nodules were finally ground to the fineness of the cement, i.e. to a maximum size of 80 microns, and the addition of the seeds was carried out in the proportion of 2% and 10% of the weight of the cement used in the mixing. Depending on the products, the results expected by its authors were not always obtained. Thus, the mechanical strengths at 7 days for seeds manufactured from APC are of the same order of magnitude or lower than those obtained with the control.

Shortly after the publication of this article (in June 1956), the Applicant Company wished to repeat the experiments described in this article in order to examine the influence of crystallization seeds on the hardening of hydraulic binders, including artificial Portland cements APC. The conditions of one of these tests and the results obtained by the Applicant Company are reproduced in Example 1 (comparative) which follows. The results were disappointing: the influence, on the setting, of the additions of seeds, prepared under the same conditions, proved to be zero. Moreover, the compressive strengths at 2 and 7 days were found of the same order of magnitude for the concrete, by comparison with a seed-free concrete.

In a second article (Silikattechnik, Dtsch., July 1959, No. 7, 326-9, 330, by Schunack (H.)), it is said that the addition of cement which has already been hardened and reground to the fineness of cement would make it possible to influence the solidification of pure pastes and of mortars, as well as that of heavy and lightweight concretes. The addition of 2% (value being defined as optimum) of seeds to pure cement pastes does not make it possible to decrease the time of the beginning of setting but only the setting time by 25% in comparison with addition-free pastes. As regards mortars, the strengths were measured at 1, 3, 7 and 28 days; at 3 d, the strength of a mortar, to which 2% of seeds have been added, is improved by 33% with respect to the addition-free control. For concretes containing Portland cement, a gain in mechanical strength of 17% was obtained at 3 d, still with an addition of 2% of seeds. Moreover, in this article, additions of $CaCl_2$ and of sodium siliconate, alone or in addition to the seeds, were carried out and, in conclusion, it is recommended to use crystallization seeds, to which chemical admixtures such as $CaCl_2$ have been added, in particular for greatly increasing the compressive strengths of the concrete during the initial days.

Disappointing results as regards the setting of hydraulic binders by incorporation of seeds during mixing are also reported in the article entitled "Effect upon strength of cement paste by addition of cement hydrates" by Tashiro, C. and Ikeda, K., which appeared in "Review of the 23rd General Meeting, Tokyo, May 1969", published by "The Cement Association of Japan" in 1969, pages 136 to 141. In this case, it concerned:

seeds obtained by hydrarich of a Portland cement paste, at 20° C., for 28 days, or autoclaved at 180° C. for 4 days, followed by grinding;

synthetic seeds, composed of CaO, $SiO_2$ and $H_2O$ and obtained in an autoclave at high pressure and high temperature.

Since this date, it does not appear that success has been achieved in preparing a setting and hardening accelerator for siliceous hydraulic binders from crystallization seeds which is effective under the usual temperature and pressure conditions.

Within the context of its research, the Applicant Company then fortuitously found a novel agent comprising crystallization seeds which had a manifest accelerating effect on the early setting and hardening of siliceous hydraulic binders under usual temperature and pressure conditions and in particular under economical conditions.

The present invention relates to a novel setting and hardening accelerating agent for siliceous hydraulic binders, characterized in that:

a. it is obtained by hydration, under usual pressure and temperature conditions, and grinding of an aqueous siliceous hydraulic binder suspension;

b. the particles of the suspension are sufficiently fine for the agent to satisfy the following test: an aqueous suspension, in a sedimentation specimen, at 20° C., containing 10 grams (dry weight) of accelerating agent in 100 ml of water, must have a sedimentation deposit height at least equal to 50% of the initial height at the end of 2 days;

c. it is in the form of an aqueous suspension.

The solids content of the aqueous suspension of the agent of the invention is generally between 5% and 75% by weight. The aqueous suspension of the agent of the invention preferably has a solids content of 5% to 55% by weight and preferably still between 7.5% and 45% by weight and better still between 10% and 35% by weight.

The agent of the invention, due to the starting materials, is generally composed of at least 35% by dry weight of calcium silicate hydrates (hereinafter denoted CSH or CaO $SiC_2$ $H_2O$), for example calcium silicate hydrate $(CaO)_{1.5}$ $SiO_2(H_2O)_{1.5}$. The remainder of the composition of the agent corresponds to the compounds of the siliceous binders hydrated and formed under usual pressure and temperature conditions, such as, for example, portlandite, calcium carbonate, calcium monosulfoaluminate or ettringite.

It is thought that the effectiveness of the agent according to the invention as regards early setting and hardening of siliceous hydraulic binders results largely from the wet grinding of the hydrated hydraulic binder (characteristic (a) of the invention), resulting in seeds which are much finer and more numerous than those which would have been obtained by a dry grinding (characteristic (b) of the invention). Finally, it is necessary to use the product in aqueous suspension (characteristic (c) of the invention) because drying would result in reagglomeration of the fine particles and in a loss in effectiveness of the accelerating agent.

The setting and hardening accelerating agent of the invention can further have one of the following advantageous characteristics:

under the abovementioned operating conditions of the test (b), it results in a sedimentation deposit height which is at least equal to:

60% of the initial height at the end of 2 days;

preferably, 70% of the initial height at the end of 2 days;

preferably still, 80% of the initial height at the end of 2 days.

The exact nature of the setting and hardening accelerating agent according to the invention is not critical. Thus, the agent according to the invention can arise from the hydration of various sources chosen from compositions which are rich in calcium silicates or pure products based exclusively on calcium silicates.

However, the effectiveness of the accelerating agent according to the invention is better if the amount of free slaked lime $Ca(OH)_2$, which may or may not be carbonated, is less than 50% by weight of the agent and preferably still at most equal to 35% by weight of the agent. The free slaked lime, $Ca(OH)_2$, is preferably partially or completely removed by carbonation.

Preferably still, in order to restrict the amount of slaked lime, reactive silica is added to the agent of the invention, the amount of silica being adjusted in order to result in the formation of LSH. The addition of reactive silica is carried out under the usual temperature and pressure conditions. In this way, the content of CSH in the agent is advantageously increased.

The agent according to the invention can result from the hydration of materials as varied as, for example, artificial Portland cements (A.P.C.); ground Portland clinkers; compound Portland cements (C.P.C.)* in B accordance with NF standard P15-301 of December 1981; or mixtures of the abovementioned raw materials.

* C.P.C. means compound portland cement (with admixtures)

However, it is preferable to resort to agents in accordance with the invention which result from the hydration of artificial Portland cements (A.P.C.), because fillers for C.P.C.* and other siliceous hydraulic binders are not capable of giving CSHs. Preferably still, an agent in accordance with the invention is chosen which results from the hydration of an artificial Portland cement having a high fineness, that is to say greater than 4,000 Blaine, such as H.P.R.* A.P.C.s, for reasons of hydration kinetics under the conditions of manufacture of the agent.

* C.P.C. means compound portland cement (with admixtures) H.P.R. means high performance resistance The agent of the invention can, of course, contain or be used in combination with additives such as, for example, a conventional setting and hardening accelerating agent, such as salts of alkali metal or alkaline-earth metal elements, carboxylates (formates, acetates or propionates) or triethanolamine. The agent of the invention can also contain or be used with additives such as, for example, a dispersing agent in order to obtain a high solids content.

The agent of the invention is advantageously used in the proportion of 0.1 to 10% (inclusive) (expressed as mass of dry agent with respect to the total mass of siliceous hydraulic binder) and, preferably, between 1% and 10% (inclusive) for sprayed concrete and, for the other applications, between 0.1% and 5% (inclusive) and preferably between 0.5% and 2% (inclusive).

The agent according to the invention is advantageous in more than one respect. Indeed:

as soon as at least 0.1% of the siliceous hydraulic binder is replaced by the agent of the invention, in a grout, mortar or concrete, a decrease is observed:
in the time of the beginning of setting,
in the time of the end of setting,
in the setting time,
both at ambient temperature and in cold weather (for example at 5° C.).

the addition of the agent according to the invention is reflected by early compressive and flexural strengths which are stronger than those appearing in the equivalent formulae of mortars and concretes which are distinguished only by the absence of the accelerating agent. Thus:

the early strengths of a mortar, verified at 6 h at 20° C., are doubled for substitutions of 0.5 to 1% of artificial Portland cement by an agent in accordance with the invention resulting from the hydration of an identical or different Portland cement and tripled for substitutions of 2% of artificial Portland cement under identical conditions.

the early strengths of a concrete are improved by:
50% at 20° C. after periods of 16 hours to 2 days for substitutions of 2% of artificial Portland cement by an agent in accordance with the invention resulting from the hydrarich of an identical or different Portland cement.
80% at 5° C. after periods of 1 to 2 days for substitutions of 2% of artificial Portland cement by an agent in accordance with the invention resulting from the hydration of an identical or different Portland cement.

The agent of the invention does not contain the chloride ion. Consequently, unlike $CaCl_2$, it can be employed in all concretes reinforced with metal reinforcements or shuttered concretes.

The effectiveness of the agent of the invention is virtually identical to that of $CaCl_2$ with respect to mortars based on artificial Portland cement.

Moreover, the agent of the invention also provides a thickening effect for grouts, mortars and concretes containing siliceous hydraulic binders to which it is added.

From an economical viewpoint, the low cost of the raw materials and the simplicity of the process for manufacturing the agent are particularly advantageous.

The properties of the agents of the invention can be taken advantage of in particular for fast form removal, cold-weather concrete placing, coatings, sprayed concrete and the precasting of components.

The accelerating agent of the present invention can be prepared simply and according to different procedures.

According to a first procedure:

a) a siliceous hydraulic binder is hydrated, between 5° and 90° C., preferably between 20° and 60° C., with an amount of water such that dilute suspensions are formed in a ratio by mass of water to hydraulic binder (W/C) of between 0.6 and 25 and preferably between 2 and 10.

b) the suspension of the hydrated inorganic particles obtained is then ground in a micromedia mill until the desired granularity is obtained. If, on conclusion of the stage (a), anhydrous materials remain, a fresh cycle of the stages (a) and (b) is necessary, for as many times as necessary.

According to a second procedure, a dilute suspension of siliceous hydraulic binder is continuously agitated in a hard porcelain jar containing corundum balls, the said suspension having:

a temperature of between 10° and 90° C. and preferably between 20° and 60° C.;

a solids content not exceeding 40% by weight;

preferably, a rotational speed of between 0.7 and 0.8 times the critical rotational speed necessary to hold the balls against the walls of the jar.

preferably, an amount of suspension such that it is level with the upper surface of the balls.

This, of course, is only one of the methods of preparation in a milling jar or ball mill which makes it possible to obtain accelerators in accordance with the invention.

The two abovementioned wet grinding processes, given by way of example, thus make it possible to prepare the agent according to the invention in an aqueous suspension.

It will be noticed that the characteristics of the accelerators (granularity and degree of progression of the hydration) obtained vary as a function:

of the nature and of the dose of the optional adjuvants introduced into the milling jar or the micromedia mill,

W/C, the agitation time, and the grinding conditions, the filling of the jar, the size and the amount, depending on the situation, of the balls or of the micromedia, and the rotational speed.

Thus, it has been observed that the increase in the milling time, the decrease in the size of the milling bodies and the decrease in the ratio by volume of the suspension with respect to that of the milling bodies tend to decrease the granularity of the accelerator particles obtained. The non-limiting examples below illustrate the present invention. The conditions of preparation and of evaluation of the various compounds employed as setting and hardening accelerating agent are reported beforehand.

A/ Exemplified Methods for the Preparation of the Setting and Hardening Accelerators According to the Invention A1. A description is given below of the method of preparation in a milling jar or ball mill which is used to prepare the accelerators of Examples 6 to 10 and 16 to 17.

3 kg of alumina balls with a diameter equal to 20 mm and 1 kg of alumina balls with a diameter equal to 40 mm are added to an alumina jar with a volume of 8 liters. 1 liter of tap water is then poured therein. 100 g of siliceous hydraulic binder are added: there is then a ratio by mass of water to cement (W/C) equal to 10. The jar is then closed. It then rotates for 60 hours at a rate of 50 to 70 rev/min. On conclusion of this last stage, a dilute suspension of hydrated hydraulic binder is obtained.

A2. A description is given below of the procedure which consists in hydrating and then in milling the hydrates obtained in a micromedia mill which is used for preparing the accelerators of Examples 12 to 14, 19, 20, 27 to 29, 31 and 32. 1,000 kg of water and 200 kg of siliceous hydraulic binder are poured into a vessel with a propeller stirrer. The hydraulic binder is hydrated at ambient temperature (approximately 20° C.) with stirring of the order of 500 revolutions/min for 4 days. The suspension is then milled in a micromedia mill of Netzsch trademark, the vessel of which has a volume of 20 liters, with a flow rate of 100 kg/hour. Hydrarich of the suspension obtained was continued for 4 days and water was readded. Finally, a second milling under the same conditions was carried out. On conclusion of this stage, a dilute suspension of hydrated hydraulic binder is obtained.

B/ Conditions of the Evaluation Tests on the Various Exemplified Compounds

B1. Characterization of the accelerating agent:
i) chemical analysis which makes it possible to know the composition of the reactants of the composition having been used for the manufacture of the agent.
ii) characterization of the fineness of the particles: sedimentation test corresponding to the above mentioned test (b)
iii) solids content determined at constant weight at 80° C.

B2. Determination of the setting of the hydraulic binder in the presence or in the absence of an accelerator.

The measurement of the time of the beginning of setting, of the time of the end of setting and of the setting time is evaluated by the refusal of the Vicat needle to sink in accordance with the conditions laid down in NF standard P15-431 for mortars and EN standard 196-3 for the corresponding pure pastes, apart from the difference that the operations were not carried out at equal consistency but with a constant W/C ratio equal to 0.35.

B3. Determination of the hardening following the phenomenon of setting by measuring the compressive and flexural strengths in accordance with EN standard 196-1 of 1987.

EXAMPLE 1 (COMPARATIVE)

Use of crystallization seeds prepared according to the operating conditions described in the article "Annales de l'Institut Technique du Bâtiment et des Travaux Publics, February 1956, No. 98, pages 137 to 158, by Messrs Duriez and Lézy".

In the first place, some blocks of pure artificial Portland cement (APC) paste containing 0.25 kg of pure water per 1 kg of cement were mixed and manufactured, then stored for 24 h in a humid room at 18° C. and then immersed for 6 days in water at 50° C. After this treatment, the hardened paste was dried in an aerated oven, adjusted to 50° C.±2° C. for 5 days and then ground until nothing was retained on a 200 sieve (corresponding to a maximum size of the particles of 75 to 80 microns). The hydrated cement powder thus obtained, used as "hydration seeds", was added in the proportion of 2% by weight with respect to the cement. It should be noted that the cements which were used for the preparation of the seeds and those which were used for the preparation of the mortars were identical. After mixing, this mortar was subjected to the following determinations:

setting detected with a needle of Vicat type;
tensile strength (T) and compressive strength (C) of a ⅓ mortar at 2, 7 and 28 days;

Moreover, a concrete was subjected at 300K to flexural strength (F) and compressive strength (C) tests at 2, 7 and 28 days.

The results of these tests are combined in the following Table I. The meanings of the symbols which appear in Table I are as follows:

b. : beginning of setting
e. : end of setting
C/W : ratio by mass (cement/water)
S. : strength
T. : tensile
C. : compressive
F. : flexural
300K : means 300 kilograms of cement per $m^3$ of concrete
⅓ : mortar composed by mass of one part of cement and of three parts of sand.

TABLE I

| | | | | S. 1/3 MORTAR bars | | | S. CONCRETE at 300 K bars | | |
|---|---|---|---|---|---|---|---|---|---|
| | C/W Mortar | C/W concrete | Setting | 2 days | 7 days | 28 days | 2 days | 7 days | 28 days |
| Control APC | 2.0 | 1.5 | b. 4h30 e. 8h20 | T. 21.2 C. 147 | 31.3 315 | 37.0 425 | F. 10.7 C. 70 | 20.0 165 | 21.2 303 |
| APC + 2% seeds | 2.0 | 1.5 | b. 4h35 e. 8h | T. 20.5 C. 147 | 30.7 297 | 37.6 410 | F. 10.7 C. 72 | 21.6 176 | 24.3 323 |

The influence of the hydration seeds appears to be virtually zero on the setting times and the initial strengths at 2 days with respect to the mortar. Even at 28 days, a significant improvement in the strengths is not recorded, either for the compressive strength or for the flexural strength.

Similar tests, carried out on other artificial Portland cements to which crystalline seeds, prepared according to the procedure of this 1956 article, were added, led to the same conclusions.

The test (b) has recently been carried out with a dry-ground hydrated cement powder according to the above-mentioned procedure (value outside the claimed range). Test (b), sedimentation height: 20%

EXAMPLE 2 (COMPARATIVE)

Influence of slaked lime on the hydration of an artificial Portland cement.

10 g of $Ca(OH)_2$ (mass of $Ca(OH)_2$)/ (mass of cement)= 1%) are added to a pure paste containing 1 kg of artificial Portland cement APC (HPR* APC from Le Teil) and 350 g of water. The composition of the artificial Portland cement APC is (in % by mass):

$C_3S$ (chemical formula $3CaO.SiO_2$) : 63%

$C_2S$ (chemical formula $2CaO.SiO_2$) : 9%

$C_3A$ (chemical formula $3CaO.Al_2O_3$) : 10%

$C_4AF$ (chemical formula $4CaO.Al_2O_3.Fe_2Al_2O_3$) : 7%

$CaCO_3$ : 4%

$CaSO_4$ : 5%

* HPR means high performance resistance

The results obtained appear in Table II below:

|  | Time of the beginning of setting | Time of the end of setting | Setting time |
|---|---|---|---|
| Control (without addition of accelerator or of $Ca(OH)_2$) | 2 h 25 min | 3 h 55 min | 1 h 30 min |
| Control (with addition of 10 g of $Ca(OH)_2$) | 2 h 25 min | 3 h 25 min | 1 h |

An addition of 1% of slaked lime does not make it possible to decrease the time of the beginning of setting, whereas an addition of appropriate hydrates for hydraulic binder can decrease this time by 50%. The time of the end of setting is decreased by only 13% with slaked lime whereas, with an addition of appropriate hydrates for hydraulic binder, this time can be decreased by 57%.

EXAMPLES 3 TO 10

Change in the Times of the Beginning and of the End of Setting and in the Setting Time as a Function of A/C=(Mass of Accelerator)/(Mass of Cement)

In order to manufacture the accelerator H1 in accordance with the invention, the artificial Portland cement defined in Example 2 was used.

From this artificial Portland cement, a dilute aqueous suspension of hydrated cement is prepared according to the method of preparation in a milling jar indicated above (method A1).

The physico-chemical properties of the suspension obtained are as follows:

solids content : 13% sedimentation (test b) : 89%

Determination of the setting of a pure paste at 20° C. and at 50% of hygrometry containing:

the artificial Portland cement APC described in Example 2;

water, in a water/cement ratio by mass equal to 0.35;

and, if appropriate, an accelerator which is, depending on the situation, $CaCl_2$ or the accelerator H1 described above.

The nature of the accelerator, the content of the accelerator, (A/C) expressed as mass of dry accelerator with respect to the mass of cement, and the results obtained appear in Table III below.

TABLE III

| No. of the example | Nature of the accelerator | A/C (%) | Beginning of setting | End of setting | Setting time |
|---|---|---|---|---|---|
| 3 | control test without accelerator | 0 | 3 h 10 min | 4 h 10 min | 1 |
| 4 | $CaCl_2$ | 1 | 1 h 40 min | 1 h 55 min | 15 min |
| 5 | $CaCl_2$ | 2 | 55 min | 1 h 25 min | 30 min |
| 6 | H1 | 1 | 1 h 10 min | 1 h 40 min | 30 min |
| 7 | H1 | 2 | 1 h | 1 h 30 min | 30 min |
| 8 | H1 | 3 | 40 min | 1 h 10 min | 30 min |
| 9 | H1 | 4 | 20 min | 50 min | 30 min |
| 10 | H1 | 5 | 27 min | 42 min | 15 min |

EXAMPLES 11 TO 14

Change in the Times of the Beginning and of the End of Setting, in the Setting Time and in the Mechanical Strengths of a Standardized Mortar as a Function of A/C=(Mass of Accelerator)/(Mass of Cement)

A standardized mortar is prepared, at 20° C. and at 50% of hygrometry, from:

25% by weight of artificial Portland cement HPR* APC from Le Teil;

75% by weight of a standardized sand CEN* according to EN standard 196-1 of May 1987;

water, with a Water/Cement ratio by mass equal to 0.5.

* HPR means high performance resistance CEN means European standardization committee In this case, the aqueous suspension of the agent H2 prepared according to the procedure A2 with HPR* APC cement from Le Teil is employed as accelerator. The physico-chemical properties of the suspension obtained are as follows:

solids content : 16% sedimentation (test b) : 85%

The results obtained appear in Tables IV, V and VI below.

TABLE IV

| No. of the example | A/C (%) | setting Beginning of setting | End of setting | Setting time |
|---|---|---|---|---|
| 11 | 0 | 2 h 40 min | 4 h 55 min | 2 h 15 min |
| 13 | 1 | 1 h 55 min | 3 h 10 min | 1 h 15 min |
| 14 | 2 | 1 h 10 min | 2 h 40 min | 1 h 30 min |

TABLE V

Change in the compressive strength (MPa) as a function of time and of A/C

| No. of the example | A/C (%) | 6 h | 1 d | 2 d | 7 d | 28 d |
|---|---|---|---|---|---|---|
| 11 | 0 | 1.5 | 23.5 | 39.2 | 55 | 64.7 |
| 12 | 0.5 | 2.7 | 26.2 | 38.3 | 52.7 | 62.8 |
| 13 | 1 | 3.5 | 25.7 | 38.5 | 52.5 | 60.2 |
| 14 | 2 | 5.2 | 28.3 | 39.4 | 51.1 | 62.2 |

TABLE VI

Change in the flexural strength (MPa) as a function of time and of A/C

| No. of the example | A/C (%) | 6 h | 1 d | 2 d | 7 d | 28 d |
|---|---|---|---|---|---|---|
| 11 | 0 | 0.5 | 5.9 | 7.6 | 9.1 | 9.9 |
| 12 | 0.5 | 0.9 | 6.1 | 7 | 8.4 | 9.3 |
| 13 | 1 | 1 | 5.9 | 7.1 | 8.6 | 9.1 |
| 14 | 2 | 1.4 | 5.8 | 7.5 | 8.4 | 9.1 |

EXAMPLES 15 TO 17

Effectiveness of the Accelerator in Cold Weather,
i.e. at 5° C. and 65% of Hygrometry A pure paste was prepared containing:

the artificial Portland cement HPR* APC from Le Teil of Example 2;

water, in a water/cement ratio by mass equal to 0.35;

and, optionally, the accelerator H1 shown in Examples 3 to 10.

* HPR means high performance resistance

The change in the times of the beginning and of the end of setting and in the setting time as a function of A/C (i.e. mass of accelerator/mass of cement) appear in Table VII below.

TABLE VII

| No. of the example | A/C (%) | Beginning of setting | End of setting | Setting time |
|---|---|---|---|---|
| 15 | 0 | 3 h 10 min | 7 h 40 min | 4 h 30 min |
| 16 | 1 | 1 h 40 min | 4 h 10 min | 2 h 30 min |
| 17 | 2 | 1 h 10 min | 3 h 40 min | 2 h 30 min |

EXAMPLES 18 TO 25

Effectiveness of the Accelerators According to the Invention Compared with Slaked Lime and with Two Chlorine-free Accelerators In order to manufacture the accelerator H2 in accordance with the invention, an artificial Portland cement was used (HPR* APC from Le Teil).

The nature and the content of the accelerator and the results obtained for the setting, at 20° C., of a pure paste of HPR* APC cement from Le Teil, with a water/cement (W/C) ratio by mass equal to 0.35, appear in Table VIII below.

* HPR means high performance resistance

TABLE VIII

| No. of the example | Nature of the accelerator | A/C (%) | Time of the beginning of setting | Time of the end of setting | Setting time |
|---|---|---|---|---|---|
| 18 | control test without accelerator | 0 | 2 h 25 min | 3 h 55 min | 1 h 30 min |
| 19 | H2 | 0.7 | 1 h 20 min | 1 h 55 min | 35 min |
| 20 | H2 | 1 | 1 h 10 min | 1 h 40 min | 30 min |
| 21 | Ca(OH)2 | 1 | 2 h 25 min | 3 h 25 min | 1 h |
| 22 | A1 | 0.5 | 1 h 55 min | 2 h 40 min | 45 min |
| 23 | A1 | 1 | 1 h 55 min | 2 h 55 min | 1 h |
| 24 | A2 | 0.5 | 2 h 20 min | 3 h 10 min | 50 min |
| 25 | A2 | 1 | 2 h 25 min | 3 h 25 min | 1 h |

The first line of Table VIII corresponds to a pure addition-free paste (Example 18).

An addition of 1% of slaked lime (Example 21) does not make it possible to decrease the time of the beginning of setting, whereas an addition of the agent H2 makes it possible to decrease this time by 50% (Example 20). The time of the end of setting is decreased by 57% with an addition of H2 (Example 20) whereas it is decreased by only 10% with the lime.

The commercial products from the company Chryso, A1 (Ceraxel 335) and A2 (Ceraxel 500), are optimized non-chlorinated accelerators. They are used in the proportion of 2 liters per 100 kg of cement in general, that is to say 0.8% on a dry basis (solids content 40%).

It is noticed that A2 does not influence the beginning of setting. An addition of A1 makes it possible to decrease the time of the beginning of setting by 21%, to be compared with 50% with H2 (Example 20). The times of the end of setting fall by 13 to 19% with A2, by 26 to 32% with A1 and by more than 50% with H2.

The effectiveness of H2, with respect to the acceleration of setting, is therefore clearly revealed.

EXAMPLES 26 TO 32

Change in the Mechanical Strengths of a Mortar as a Function of A/C[=(Mass of Accelerator/mass of Cement)]. for Large Addition Doses Composition of the mortar:

artificial Portland cement : 25% by mass standardized sand : 75% by mass and addition of water, such that W/C.=0.5 and, if appropriate, a setting and hardening accelerator.

The Portland cements used are as follows:

SWSR 55 APC from Val d'Azergues with the composition in % by mass:
- $C_3S$ (Chemical formula $3CaO.SiO_2$) : 56%
- $C_2S$ (Chemical formula $2CaO.SiO_2$) : 20%
- $C_3A$ (Chemical formula $3CaO.Al_2O_3$) : 2%
- $C_4AF$ (Chemical formula $4CaO.Al_2O_3.Fe_2Al_2O_3$) : 14%
- $CaCO_3$ : 1%
- $CaSO_4$ : 3.5%

The SWSR 55 APC cement from Val d'Azergues is used in Examples 26 to 29.

HSC 55 APC from Le Teil with the composition in % by mass:
- $C_3S$ (Chemical formula $3CaO.SiO_2$) : 62%
- $C_2S$ (Chemical formula $2CaO.SiO_2$) : 21%
- $C_3A$ (Chemical formula $3CaO.Al_2O_3$) : 3%
- $C_4AF$ (Chemical formula $4CaO.Al_2O_3.Fe_2Al_2O_3$) : 7%
- $CaCO_3$ : 1%
- $CaSO_4$ : 3.5%

The HSC 55 APC cement from Le Teil is used in Examples 30 to 32.

The hydrate H2, defined in Examples 18 to 25, is used as accelerator in Examples 27 to 29 and 31. The abovementioned hydrate H2 is used, in combination with the accelerator A2 targeted in Examples 24 and 25, in Example 32.

Evaluation of the mortars is carried out through 4×4×16 cm specimens which are prepared as follows:

mixing water and accelerators (manual stirring then homogenization with a Perrier mixer for 1 min at low speed, LS);

addition of cement;

mixing for 30 s at LS;

addition of the sand at ns, this operation lasting 30 s;

standing : 1 min;

mixing for 1 min at HS (high speed);

placing on a vibrating table, generally for 1 min, except for accelerator-free mortars where, due to bleeding problems, the time was shorter.

The results of the flexural strength, F, and the compressive strength, C, appear in Table IX and are expressed in MPa.

TABLE IX

| Ex. No. | H2 accelerator in % by dry weight with respect to the amount of cement | bulk d. | | 2 h | 4 h | 6 h | 24 h | 28 d |
|---|---|---|---|---|---|---|---|---|
| 26 | 0% | 2.29 | F | NRM | NRM | NRM | 3.34 | 7.30 |
|  |  |  | C |  |  |  | 14.20 | 44.50 |
| 27 | 3% | 2.23 | F | NRM | 0.26 | 0.64 | 3.36 | 6.64 |
|  |  |  | C |  | 0.92 | 3.13 | 15.10 | 41.70 |
| 28 | 6% | 2.24 | F | NRM | 0.47 | 1.11 | 4.20 | 6.44 |
|  |  |  | C |  | 2.07 | 5.52 | 19.60 | 48.20 |
| 29 | 9% | 2.09 | F | NRM | 0.56 | 1.10 | 3.75 | 5.63 |
|  |  |  | C |  | 3.16 | 6.21 | 19.10 | 38.40 |

NRM means Not Removable from the Mold. bulk d., which means$_{apparent}$ density of the specimens, is the quotient of the mass of a specimen to its volume, estimated at 4×4×16 cm$^3$.

Analysis of Table IX shows that:

the addition-free mortar can only be removed from the mold after at least 6 h;

the$_{apparent}$ density remains virtually constant for values of addition of hydrates of between 0 and 6% inclusive;

for the short periods 4 and 6 h, the strengths are increasing functions of the amount of addition;

from 6% of addition, the mixture has the appearance of a fairly "dry" mortar, suggesting good placing in a true spraying test.

In conclusion, with respect to these results, the addition optimum lies between 6 and 9%: density still correct at 6% but strengths at 4 h slightly better at 9%. of addition.

To see the influence of the nature of the cement, some tests were carried out with the HSC 55 APC cement from Le Teil, which contains more silicates than the SWSR 55 APC cement from Val d'Azergues. The results are combined in the following Table X:

TABLE X

| Ex. No. | Additions in % by dry weight with respect to the amount of cement | bulk d. | | 2 h | 4 h | 6 h | 24 h |
|---|---|---|---|---|---|---|---|
| 30 | without addition | 2.27 | F | NRM | NRM | NRM | 2.56 |
|  |  |  | C |  |  |  | 12.27 |
| 31 | 6% H2 | 2.20 | F | NRM | 0.69 | 1.22 | 4.20 |
|  |  |  | C |  | 3.12 | 5.42 | 18.23 |
| 32 | 6% H2 + 1% A2 | 2.19 | F | NRM | 0.94 | 0.84 | 4.98 |
|  |  |  | C |  | 4.25 | 7.03 | 19.20 |

With the HSC 55 APC cement from Le Teil, the mechanical strengths are better with a supplementary addition of A2.

EXAMPLES 33 TO 35

Effectiveness of the Accelerators of the Invention on the Compressive Mechanical Strengths (Values in MPa) of the Concretes The accelerator used in Examples 34 and 35 is the hydrate H2 defined in Examples 18 to 25.

Composition of the concretes:

|  | Example 33 | Example 34 | Example 35 |
|---|---|---|---|
| 10 mm/20 mm Gravel (kg/m$^3$) | 837 | 837 | 837 |
| 5 mm/10 mm Gravel (kg/m$^3$) | 281 | 281 | 281 |
| 0/5 mm Sand (kg/m$^3$) | 808 | 808 | 808 |
| Artificial Portland Cement described in Example 2 (kg/m$^3$) | 300 | 297 | 294 |
| Water (l/m$^3$) | 180 | 164.25 | 148.5 |
| Amount of accelerator (kg/m$^3$) | 0 | 18.75 (i.e. 3 kg on a dry basis (1%) + 15.75 kg of water) | 37.5 (i.e. 6 kg on a dry basis (2%) + 31.5 kg of water) |

The values of the compressive mechanical strengths (values in MPa) are combined in the two following tables for the two temperatures used.

| | Amount of accelerator H2 (%) | | |
|---|---|---|---|
| | Control | In suspension | |
| T = 5° C. | Example 33 | Example 34 | Example 35 |
| Period | 0 | 1 | 2 |
| 16 h | 0 | 1.2 | 1.4 |
| 1 d | 2.1 | 3.3 (+57%) | 3.6 (+71%) |
| 2 d | 6 | 8.6 (+43%) | 10.8 (+80%) |
| 7 d | 18.9 | 22.8 (+21%) | 25.8 (+37%) |
| 28 d | 29.1 | 34.8 (+20%) | 36.8 (+26%) |

| | Amount of accelerator H2 (%) | | |
|---|---|---|---|
| | Control | In suspension | |
| T = 20° C. | Example 33 | Example 34 | Example 35 |
| Period | 0 | 1 | 2 |
| 6 h | not removable from the mould | | 1.1 |
| 8 h | not removable from the mould | | 6.8 |
| 16 h | 8.8 | 12 (+36%) | 13.8 (+57%) |
| 1 d | 12.3 | 15.8 (+28%) | 19.4 (+58%) |
| 2 d | 19.4 | 24.1 (+24%) | 28.5 (+47%) |
| 7 d | 34.6 | 34.7 (−) | 39 (+13%) |
| 28 d | 43.2 | 41.4 (−4%) | 44.7 (+3%) |

Conclusions

The hardening accelerating effect is present.

the early strengths of the concretes of Examples 34 and 35 are improved by:

50% at 20° C. after periods of 16 hours to 2 days for substitutions of 2% of artificial Portland cement by H2;

80% at 5° C. after periods of 1 to 2 days for substitutions of 2% of artificial Portland cement by H2.

the specimens can be removed from the molds sooner when H2 is added. If a compressive strength of 1 to 2 MPa is sufficient for removing from the mold, an addition of 2% of H2 would make it possible to remove from the mold before 6 h, whereas between 8 h and 16 h is required without addition.

at ages of 28 d, the strengths are identical at 20° C., with or without additions, and always better at 5° C. with additions.

We claim:

1. A calcium silicate hydrate accelerating agent for siliceous hydraulic binders, which comprises an accelerating agent obtained by hydration and wet grinding of an aqueous suspension comprising Portland cement and optionally containing gypsum; wherein the particles of the suspension are sufficiently fine so that an aqueous suspension in a sedimentation specimen at 20° C. containing 10 grams dry weight of the accelerating agent in 100 ml of water has a sedimentation deposit height at the end of 2 days at least equal to 50% of the initial height; and wherein the accelerating agent is in the form of an aqueous suspension having a solids content from 5% to 55% by weight.

2. An agent according to claim 1, wherein the aqueous suspension of the agent has a solids content of 7.5% to 45% by weight.

3. An agent according to claim 1, wherein the aqueous suspension of the agent has a solids content of 10% to 35% by weight.

4. An agent according to claim 1, wherein the particles of the suspension are sufficiently fine to result in a sedimentation deposit height at the end of 2 days which is at least equal to 60% of the initial height.

5. An agent according to claim 1, wherein the particles of the suspension are sufficiently fine to result in a sedimentation deposit height at the end of 2 days which is at least equal to 70% of the initial height.

6. An agent according to claim 1, wherein the particles of the suspension are sufficiently fine to result in a sedimentation deposit height at the end of 2 days which is at least equal to 80% of the initial height.

7. An agent according to claim 1, which further comprises silica for the purpose of forming more calcium silicate hydrates.

8. An agent according to claim 1, wherein the amount of free slaked lime, $Ca(OH)_2$, carbonated or uncarbonated, in the agent is less than 50% by weight.

9. An agent according to claim 1, wherein the amount of free slaked lime, $Ca(OH)_2$, carbonated or uncarbonated, in the agent is at most 35% by weight.

10. An agent to claim 1 wherein free slaked lime, $Ca(OH)_2$ is partially or completely removed from the agent by carbonation.

11. An agent according to claim 1 further comprising a salt of an alkali metal or alkaline-earth metal element, a formate, acetate or propionate or triethanolamine.

12. An agent according to claim 1, further comprising a dispersing agent.

13. A grout, mortar or concrete containing a siliceous hydraulic binder and an accelerating agent according to claim 1.

14. A grout, mortar, or concrete according to claim 13, which contains from 0.1% to 10% of the accelerating agent expressed as mass of dry agent with respect to the total mass of siliceous hydraulic binder.

15. An accelerating agent according to claim 1, which comprises at least 35% by dry weight of calcium silicate hydrates.

16. An accelerating agent according to claim 1, which comprises calcium silicate hydrate of the formula $(CaO)_{1.5} SiO_2(H_2O)_{1.5}$.

17. A mixture comprising a siliceous hydraulic binder and an accelerating agent according to claim 1.

18. A method of accelerating the setting and hardening time of a paste of a siliceous hydraulic binder, said method comprising adding a calcium silicate hydrate accelerating agent to said paste, the improvement comprising:

producing the accelerating agent by hydrating a siliceous hydraulic binder comprising Portland cement and, optionally, gypsum and grinding said hydraulic binder in an aqueous suspension to obtain an aqueous suspension with a solids content of from 5% to 55% by weight;

and adding said aqueous suspension to said paste in a proportion of suspension to paste of 0.1% to 10% by weight, expressed as dry solids of said accelerating agent to the total weight of said paste;

with the proviso that said wet ground solids in the accelerating agent have a particle size so that, at 20° C. in a sedimentation specimen containing 10 grams by dry weight of accelerating agent in 100 ml of water, the sedimentation deposit height at the end of two days is at least equal to 50% of the initial height.

* * * * *